(12) United States Patent
Raschke et al.

(10) Patent No.: US 8,488,046 B2
(45) Date of Patent: Jul. 16, 2013

(54) CONFIGURABLE TELE WIDE MODULE

(75) Inventors: Alexander Raschke, Weston, FL (US); Klaus Raschke, Weston, FL (US); Ellen Cargill, Norfolk, MA (US); John Toor, Palo Alto, CA (US); Ellis Betensky, Ottawa (CA)

(73) Assignee: DigitalOptics Corporation, San Jose, CA (US)

( * ) Notice: Subject to any disclaimer, the term of this patent is extended or adjusted under 35 U.S.C. 154(b) by 533 days.

(21) Appl. No.: 12/005,686

(22) Filed: Dec. 27, 2007

(65) Prior Publication Data

US 2009/0167924 A1 Jul. 2, 2009

(51) Int. Cl.
*H04N 5/232* (2006.01)
*H04N 5/225* (2006.01)
*G03B 13/00* (2006.01)

(52) U.S. Cl.
USPC .......................................... 348/345; 348/373

(58) Field of Classification Search
USPC ............................ 348/240.99, 240.3, 344, 347
See application file for complete search history.

(56) References Cited

U.S. PATENT DOCUMENTS

| | | | |
|---|---|---|---|
| 2,279,372 A | 4/1942 | Herzberger | 88/57 |
| 3,087,384 A | 4/1963 | Baur et al. | 88/57 |
| 3,599,377 A | 8/1971 | Dartnell | 51/284 |
| 3,609,270 A | 9/1971 | Jorgensen et al. | 200/67 |
| 4,174,153 A * | 11/1979 | Laurent | 359/673 |
| 4,257,086 A | 3/1981 | Gulliksen | |
| 4,290,168 A | 9/1981 | Binge | |
| 4,879,592 A | 11/1989 | Ernest | 358/42 |
| 4,894,707 A | 1/1990 | Yamawaki et al. | |
| 5,016,993 A | 5/1991 | Akitake | 350/429 |

(Continued)

FOREIGN PATENT DOCUMENTS

| CN | 1324012 A | 11/2001 |
|---|---|---|
| CN | 1722453 A | 1/2006 |

(Continued)

OTHER PUBLICATIONS

Office Action regarding Chinese Patent Application No. 200680041383.0, Application Date: Sep. 5, 2006, date of Office Action: Dec. 18, 2009, 8 pages.

(Continued)

*Primary Examiner* — Roberto Velez
*Assistant Examiner* — Joel Fosselman
(74) *Attorney, Agent, or Firm* — Larry E. Henneman, Jr.; Gregory P. Gibson; Henneman & Associates, PLC

(57) ABSTRACT

A tele wide module includes a first optics group, a fixed position for the first optics group, a second optics group, a set of predetermined positions for the second optics group, a selector for selecting a first position from the set of predetermined positions, and an image sensor. The first optics group is configured to provide a focus to the image sensor. The focus is based on the selected first position. A method of adjusting a lens configuration selects a first position from a set of positions. Based on the selected position, the method deposes a second lens group in relation to a first lens group. Typically, the position of the first lens group is fixed. Through the first and second lens groups, the method provides an image to an image sensor. The method of some embodiments provides a focused image to the image sensor by using a hyper focal setting.

23 Claims, 12 Drawing Sheets

U.S. PATENT DOCUMENTS

| | | | |
|---|---|---|---|
| 5,034,824 A | 7/1991 | Morisawa et al. | |
| 5,095,204 A | 3/1992 | Novini | 250/223 B |
| 5,119,121 A * | 6/1992 | Kobayashi et al. | 396/80 |
| 5,177,638 A | 1/1993 | Emura et al. | 359/704 |
| 5,196,963 A | 3/1993 | Sato et al. | 359/699 |
| 5,272,567 A | 12/1993 | Inoue | 359/696 |
| 5,510,937 A | 4/1996 | Mogamiya | |
| 5,546,147 A | 8/1996 | Baxter et al. | 354/187 |
| 5,689,746 A | 11/1997 | Akada et al. | |
| 5,754,210 A | 5/1998 | Haneda et al. | 347/116 |
| 5,805,362 A | 9/1998 | Hayes | 359/819 |
| 5,835,208 A | 11/1998 | Hollmann et al. | 356/124 |
| 5,908,586 A | 6/1999 | Hobbs et al. | |
| 5,926,965 A | 7/1999 | Shijo et al. | 33/390 |
| 5,954,192 A | 9/1999 | Iitsuka | 200/336 |
| 5,966,248 A | 10/1999 | Kurokawa et al. | 359/697 |
| 5,976,912 A | 11/1999 | Fukutomi et al. | |
| 6,091,902 A | 7/2000 | Komatsuzaki et al. | 396/60 |
| 6,122,009 A | 9/2000 | Ueda | |
| 6,282,380 B1 | 8/2001 | Yamamoto | |
| 6,292,306 B1 | 9/2001 | Betensky | 359/663 |
| 6,330,400 B1 | 12/2001 | Bittner et al. | 396/72 |
| 6,384,397 B1 | 5/2002 | Takiar et al. | |
| 6,414,299 B1 | 7/2002 | Churei | |
| 6,417,601 B1 | 7/2002 | Kim | 310/333 |
| 6,476,417 B2 | 11/2002 | Honda et al. | |
| 6,530,703 B2 | 3/2003 | Nakano et al. | |
| 6,597,516 B2 | 7/2003 | Saitoh et al. | 359/694 |
| 6,681,162 B2 | 1/2004 | Yun | |
| 6,686,588 B1 | 2/2004 | Webster et al. | |
| 6,734,419 B1 | 5/2004 | Glenn et al. | |
| 6,741,405 B1 | 5/2004 | Chen | |
| 6,760,167 B2 | 7/2004 | Meehan et al. | 359/822 |
| 6,762,888 B1 * | 7/2004 | Oshima | 359/696 |
| 6,792,246 B2 | 9/2004 | Takeda et al. | 455/41.1 |
| 6,798,031 B2 | 9/2004 | Honda et al. | |
| 6,805,499 B2 * | 10/2004 | Westerweck et al. | 396/448 |
| 6,869,233 B2 | 3/2005 | Westerweck et al. | 396/460 |
| 6,940,209 B2 | 9/2005 | Henderson | 310/323.02 |
| 7,009,654 B2 | 3/2006 | Kuno et al. | |
| 7,010,224 B2 | 3/2006 | Nomura | 396/85 |
| 7,061,106 B2 | 6/2006 | Yang et al. | |
| 7,088,525 B2 | 8/2006 | Finizio et al. | 359/703 |
| 7,091,571 B1 | 8/2006 | Park et al. | |
| 7,122,787 B2 | 10/2006 | Nishizawa | |
| 7,156,564 B2 | 1/2007 | Watanabe et al. | |
| 7,193,793 B2 | 3/2007 | Murakami et al. | 359/791 |
| 7,199,438 B2 | 4/2007 | Appelt et al. | |
| 7,259,497 B2 | 8/2007 | Sakano et al. | |
| 7,301,712 B2 | 11/2007 | Kamo | 359/785 |
| 7,330,648 B2 | 2/2008 | Morinaga et al. | 396/144 |
| 7,379,112 B1 | 5/2008 | Raad | |
| 7,394,602 B2 | 7/2008 | Chen et al. | 359/785 |
| 7,400,454 B2 | 7/2008 | Kubota et al. | 359/689 |
| 7,420,609 B2 | 9/2008 | Yamaguchi et al. | 348/335 |
| 7,444,073 B2 | 10/2008 | Lee | |
| 7,477,461 B2 | 1/2009 | Bareau et al. | |
| 7,531,773 B2 | 5/2009 | Westerweck et al. | |
| 7,573,011 B2 | 8/2009 | Westerweck et al. | |
| 7,579,583 B2 | 8/2009 | Mok et al. | |
| 7,580,209 B2 | 8/2009 | Westerweck et al. | |
| 7,583,309 B2 | 9/2009 | Aizawa et al. | |
| 7,590,505 B2 | 9/2009 | Grziwa et al. | |
| 7,605,991 B2 | 10/2009 | Chiang | |
| 7,638,813 B2 | 12/2009 | Kinsman | |
| 7,670,067 B2 | 3/2010 | Utz | |
| 7,675,565 B2 | 3/2010 | Cheng | |
| 7,679,669 B2 | 3/2010 | Kwak | |
| 7,806,606 B2 | 10/2010 | Westerweck | |
| 7,825,985 B2 | 11/2010 | Westerweck et al. | |
| 8,092,102 B2 | 1/2012 | Shangguan et al. | |
| 8,112,128 B2 | 2/2012 | Lee | |
| 8,149,321 B2 | 4/2012 | Ryu et al. | |
| 2001/0028513 A1 | 10/2001 | Takanashi et al. | |
| 2002/0012066 A1 * | 1/2002 | Nagai | 348/373 |
| 2002/0018140 A1 | 2/2002 | Suemoto et al. | 348/358 |
| 2002/0102946 A1 | 8/2002 | SanGiovanni | 455/90 |
| 2002/0136556 A1 | 9/2002 | Nomura et al. | |
| 2002/0142798 A1 | 10/2002 | Miyake | |
| 2002/0144369 A1 | 10/2002 | Biggs et al. | |
| 2002/0145676 A1 | 10/2002 | Kuno et al. | |
| 2002/0167605 A1 | 11/2002 | Akimoto et al. | |
| 2002/0191103 A1 | 12/2002 | Akimoto et al. | |
| 2003/0012573 A1 | 1/2003 | Sekizawa et al. | |
| 2003/0043477 A1 | 3/2003 | Saitoh | |
| 2003/0071342 A1 | 4/2003 | Honda et al. | |
| 2003/0137595 A1 | 7/2003 | Takachi | |
| 2003/0146998 A1 | 8/2003 | Doering et al. | |
| 2003/0174419 A1 | 9/2003 | Kindler et al. | 359/819 |
| 2003/0214021 A1 | 11/2003 | Zhou et al. | |
| 2004/0012698 A1 | 1/2004 | Suda et al. | |
| 2004/0017501 A1 | 1/2004 | Asaga et al. | |
| 2004/0027687 A1 | 2/2004 | Bittner et al. | |
| 2004/0042780 A1 | 3/2004 | Kindaichi et al. | |
| 2004/0042785 A1 | 3/2004 | Watanabe et al. | |
| 2004/0042786 A1 | 3/2004 | Watanabe et al. | |
| 2004/0056970 A1 | 3/2004 | Westerweck et al. | 348/240.3 |
| 2004/0056974 A1 | 3/2004 | Kitajima et al. | |
| 2004/0057720 A1 * | 3/2004 | Westerweck et al. | 396/448 |
| 2004/0095657 A1 | 5/2004 | Takanashi et al. | |
| 2004/0109079 A1 | 6/2004 | Fujimoto et al. | |
| 2004/0114252 A1 * | 6/2004 | Tanaka et al. | 359/699 |
| 2004/0151486 A1 * | 8/2004 | Goris et al. | 396/147 |
| 2004/0165877 A1 | 8/2004 | Hsiao | |
| 2004/0189853 A1 | 9/2004 | Takeuchi et al. | |
| 2004/0203532 A1 | 10/2004 | Mizuta | 455/90.3 |
| 2004/0223068 A1 | 11/2004 | Kamo | |
| 2004/0223072 A1 | 11/2004 | Maeda et al. | |
| 2004/0258405 A1 | 12/2004 | Shiratori et al. | 396/458 |
| 2005/0014538 A1 | 1/2005 | Hyun et al. | |
| 2005/0046740 A1 | 3/2005 | Davis | |
| 2005/0063698 A1 | 3/2005 | Usuda et al. | |
| 2005/0157195 A1 | 7/2005 | Ohashi et al. | |
| 2005/0162534 A1 * | 7/2005 | Higashiyama et al. | 348/240.1 |
| 2005/0185088 A1 | 8/2005 | Kale et al. | |
| 2005/0212947 A1 | 9/2005 | Sato et al. | |
| 2005/0219399 A1 | 10/2005 | Sato et al. | |
| 2005/0248684 A1 | 11/2005 | Machida | |
| 2005/0264670 A1 | 12/2005 | Yamaguchi et al. | 348/335 |
| 2005/0274883 A1 | 12/2005 | Nagano | |
| 2005/0285016 A1 | 12/2005 | Kong et al. | |
| 2006/0006486 A1 | 1/2006 | Seo et al. | |
| 2006/0028573 A1 | 2/2006 | Seo et al. | |
| 2006/0044450 A1 | 3/2006 | Wolterink et al. | |
| 2006/0049720 A1 | 3/2006 | Henderson et al. | 310/328 |
| 2006/0056389 A1 | 3/2006 | Monk et al. | 370/352 |
| 2006/0083503 A1 | 4/2006 | Fukai | |
| 2006/0103754 A1 | 5/2006 | Wenstrand et al. | |
| 2006/0113867 A1 | 6/2006 | Sakatani et al. | 310/323.17 |
| 2006/0124746 A1 | 6/2006 | Kim et al. | |
| 2006/0132644 A1 | 6/2006 | Shangguan et al. | |
| 2006/0192885 A1 | 8/2006 | Calvet et al. | |
| 2006/0209205 A1 | 9/2006 | Tsai | |
| 2006/0216014 A1 | 9/2006 | Morinaga et al. | |
| 2006/0243884 A1 | 11/2006 | Onodera et al. | |
| 2006/0261257 A1 | 11/2006 | Hwang | |
| 2006/0291061 A1 | 12/2006 | Iyama et al. | 359/614 |
| 2007/0018043 A1 | 1/2007 | Lamoree et al. | |
| 2007/0053672 A1 * | 3/2007 | Westerweck et al. | 396/79 |
| 2007/0058069 A1 | 3/2007 | Chen et al. | |
| 2007/0074966 A1 | 4/2007 | Yamamoto et al. | 200/547 |
| 2007/0077051 A1 * | 4/2007 | Toor et al. | 396/144 |
| 2007/0077052 A1 | 4/2007 | Chang | 396/144 |
| 2007/0086777 A1 | 4/2007 | Fujita | 396/452 |
| 2007/0108847 A1 | 5/2007 | Chang | |
| 2007/0122146 A1 | 5/2007 | Ryu | 396/529 |
| 2007/0146489 A1 * | 6/2007 | Kosako et al. | 348/208.7 |
| 2007/0147195 A1 | 6/2007 | Morinaga | |
| 2007/0154198 A1 | 7/2007 | Oh et al. | |
| 2007/0201866 A1 | 8/2007 | Kihara | |
| 2007/0217786 A1 | 9/2007 | Cho et al. | |
| 2007/0280667 A1 | 12/2007 | Shin | |
| 2010/0325883 A1 | 12/2010 | Westerweck et al. | |
| 2011/0052183 A1 | 3/2011 | Westerweck | |
| 2011/0228154 A1 | 9/2011 | Westerweck et al. | |
| 2011/0292526 A1 | 12/2011 | Westerweck et al. | |

FOREIGN PATENT DOCUMENTS

| CN | 1846166 A | 10/2006 |
|---|---|---|
| DE | 10346374 A1 | 4/2005 |
| EP | 59176710 | 6/1984 |
| EP | 0813236 A1 | 12/1997 |
| EP | 11052210 | 2/1999 |
| EP | 1148406 A2 | 10/2001 |
| EP | 1148406 A3 | 6/2002 |
| EP | 1357726 A1 | 10/2003 |
| EP | 1429168 A | 6/2004 |
| EP | 1434426 A2 | 6/2004 |
| EP | 1445803 A2 | 8/2004 |
| GB | 1378515 | 12/1974 |
| GB | 2315186 A | 1/1998 |
| GB | 2387063 A | 10/2003 |
| JP | 63-236006 A | 9/1988 |
| JP | 402123335 A | 5/1990 |
| JP | 05-164953 A | 6/1993 |
| JP | 05-173223 A | 7/1993 |
| JP | 06-160699 A | 6/1994 |
| JP | 11-72678 | 3/1999 |
| JP | 11-133280 A | 5/1999 |
| JP | 2001-188155 A | 7/2001 |
| JP | 2001-292365 A | 10/2001 |
| JP | 2002-189163 A | 7/2002 |
| JP | 2002-252796 A | 9/2002 |
| JP | 2002-262164 A | 9/2002 |
| JP | 2002-286987 | 10/2002 |
| JP | 2003-051973 A | 2/2003 |
| JP | 2003-078077 A | 3/2003 |
| JP | 2003-131112 A | 5/2003 |
| JP | 2003-219284 A | 7/2003 |
| JP | 2003-262778 A | 9/2003 |
| JP | 2004-139035 A | 5/2004 |
| JP | 2004-219982 A | 8/2004 |
| JP | 2004-302058 A | 10/2004 |
| JP | 2005-107084 | 4/2005 |
| JP | 2005-210628 A | 8/2005 |
| JP | 2005-292235 A | 10/2005 |
| JP | 2006-003851 A | 1/2006 |
| JP | 200653232 A | 2/2006 |
| JP | 2006-072165 * | 3/2006 |
| JP | 2006-162829 A | 6/2006 |
| JP | 2006-039480 | 9/2006 |
| JP | 2007-086818 A | 4/2007 |
| JP | 2007-108534 | 4/2007 |
| JP | 2007-121820 A | 5/2007 |
| WO | WO 00/06973 A1 | 2/2000 |
| WO | WO 2004/027880 A2 | 4/2004 |

OTHER PUBLICATIONS

"High Precision Optical Assembly Starts Here", Laser Alignment and Assembly Station, Opto-Alignment Technology, Inc.,1996, 4 pages.
Non-Final Office Action dated Jun. 11, 2009, U.S. Appl. No. 12/287,469, filed Oct. 8, 2008, Westerweck, Lothar.
A first office action, date of issue: Sep. 19, 2010, patent application No. 200780047588.4, application date: Dec. 27, 2007, title of invention: "Three-Element Photographic Objective with Reduced Tolerance Sensitivities", 13 pages.
3rd foreign office action, date of notification: Dec. 7, 2011, Application No. 200880023704.3, 6 pages.
Office Action dated Apr. 23, 2012, U.S. Appl. No. 13/214,696, filed Aug. 22, 2011, 28 pages.
PCT Application Serial No. PCT/US08/008999, International Search Report and Written Opinion dated Oct. 23, 2008.
PCT Application Serial No. PCT/US08/008999, International Preliminary Report on Patentability dated Jul. 8, 2010.
CN Application No. 200880126200.4, Office Action dated Nov. 28, 2012 (English translation).
U.S. Appl. No. 11/444,277, Office Action dated Aug. 5, 2008.
U.S. Appl. No. 11/444,277, Office Action dated May 7, 2009.
U.S. Appl. No. 11/444,277, Office Action dated Nov. 18, 2009.
U.S. Appl. No. 11/444,277, Office Action dated Aug. 3, 2010.
U.S. Appl. No. 11/444,277, Office Action dated Mar. 1, 2011.
U.S. Appl. No. 11/444,277, Notice of Allowance dated Aug. 18, 2011.
PCT Application No. PCT/US2007/013014, International Search Report and Written Opinion dated Aug. 27, 2008.
PCT Application No. PCT/US2007/013014, International Preliminary Report on Patentability dated Dec. 18, 2008.
CN Application No. 200780026542.4, Office Action dated Nov. 13, 2009 (English translation).
CN Application No. 200780026542.4, Office Action dated Apr. 27, 2011 (English translation).
CN Application No. 200780026542.4, Office Action dated Oct. 9, 2011 (English translation).
JP Application No. 2009-513308, Office Action dated Dec. 9, 2011 (English translation).
U.S. Appl. No. 13/214,696, Office Action dated Jan. 13, 2012.
U.S. Appl. No. 11/514,811, Office Action dated Jun. 6, 2008.
U.S. Appl. No. 11/514,811, Notice of Allowance dated Sep. 22, 2008.
PCT Application No. PCT/US06/034792, International Search Report and Written Opinion dated Aug. 7, 2007.
PCT Application No. PCT/US06/034792, International Preliminary Report on Patentability dated Mar. 11, 2008.
CN Application Serial No. 2006-80041383.0, Office Action dated Jan. 7, 2010 (English translation).
CN Application Serial No. 2006-80041383.0, Office Action dated Jul. 14, 2010 (English translation).
CN Application Serial No. 2006-80041383.0, Notice of Allowance dated Oct. 28, 2010 (English translation).
EP Application No. 06814261.1, European Search Report dated Jul. 5, 2010.
EP Application No. 06814261.1, Supplemental European Search Report dated Jul. 22, 2010.
EP Application No. 06814261.1, Decision to Grant dated Jun. 28, 2012.
JP Application No. 2008-530180, Office Action dated Sep. 30, 2011 (English translation).
JP Application No. 2008-530180, Office Action dated Aug. 21, 2012 (English translation).
KR Application No. 10-2008-7005469, Office Action dated Sep. 29, 2012 (English translation).
U.S. Appl. No. 12/317,132, Notice of Allowance dated May 21, 2011.
U.S. Appl. No. 13/204,564, Office Action dated Nov. 21, 2012.
U.S. Appl. No. 11/888,939, Office Action dated Jul. 18, 2008.
U.S. Appl. No. 11/888,939, Ex Parte Quayle Action dated Dec. 3, 2008.
U.S. Appl. No. 11/888,939, Notice of Allowance dated May 21, 2009.
PCT Application No. PCT/US07/017696, International Search Report and Written Opinion dated Aug. 7, 2008.
PCT Application No. PCT/US07/017696, International Preliminary Report on Patentability dated Aug. 7, 2008.
CN Application No. 200780037571.0, Office Action dated Jun. 21, 2010 (English translation).
CN Application No. 200780037571.0, Notice of Allowance dated May 9, 2011 (English translation).
U.S. Appl. No. 11/888,979, Office Action dated Oct. 24, 2008.
U.S. Appl. No. 11/888,979, Notice of Allowance dated Feb. 3, 2009.
PCT Application No. PCT/US07/017698, International Search Report and Written Opinion dated Aug. 8, 2008.
PCT Application No. PCT/US07/017698, International Preliminary Report on Patentability dated Feb. 19, 2009.
CN Application No. 200780037641.2, Office Action dated Jul. 14, 2010 (English translation).
CN Application No. 200780037641.2, Office Action dated Jan. 4, 2011 (English translation).
CN Application No. 200780037641.2, Office Action dated May 10, 2011 (English translation).
CN Application No. 200780037641.2, Notice of Allowance dated Aug. 17, 2011 (English translation).
U.S. Appl. No. 11/893,940, Office Action dated Jan. 27, 2009.
U.S. Appl. No. 11/893,940, Notice of Allowance dated May 7, 2009.
PCT Application No. PCT/US07/019933, International Search Report and Written Opinion dated Apr. 23, 2008.
PCT Application No. PCT/US07/019933, International Preliminary Report on Patentability dated Mar. 26, 2009.

U.S. Appl. No. 12/287,469, Notice of Allowance dated Sep. 21, 2009.
U.S. Appl. No. 11/644,459, Office Action dated Apr. 22, 2008.
U.S. Appl. No. 11/644,459, Notice of Allowance dated Sep. 16, 2008.
PCT Application No. PCT/US07/026335, International Search Report and Written Opinion dated Sep. 3, 2008.
PCT Application No. PCT/US07/026335, International Preliminary Report on Patentability dated Jul. 2, 2009.
CN Application Series No. 2007-80047588.4, Notice of Allowance dated May 20, 2011 (English translation).
JP Application No. 2009-542972, Office Action dated Dec. 6, 2011 (English translation).
U.S. Appl. No. 11/980,021, Notice of Allowance dated Sep. 2, 2010.
PCT Application No. PCT/US08/008708, International Search Report and Written Opinion dated Dec. 10, 2008.
PCT Application No. PCT/US08/008708, International Preliminary Report on Patentability dated Jan. 19, 2010.
CN Application Serial No. 2008-80023704.3, Office Action dated Jan. 26, 2011 (English translation).
CN Application Serial No. 2008-80023704.3, Office Action dated Jun. 30, 2011 (English translation).
CN Application Serial No. 2008-80023704.3, Office Action dated Jul. 24, 2012 (English translation).
JP Application No. 2010-517011, Office Action dated Dec. 6, 2011 (English translation).
JP Application No. 2010-517011, Office Action dated Oct. 30, 2012 (English translation).
U.S. Appl. No. 12/873,995, Office Action dated Mar. 27, 2012.
U.S. Appl. No. 12/873,995, Office Action dated Jul. 18, 2012.
U.S. Appl. No. 12/873,995, Advisory Action dated Sep. 7, 2012.
CN Application No. 200880126200.4, Office Action dated Apr. 28, 2013 (English translation).
CA Application No. 2,620,842, Office Action dated Mar. 7, 2013.
KR Application No. 10-2008-7005469, Notice of Allowance dated May 16, 2013 (English translation).

* cited by examiner

Fig. 2A (TELE)

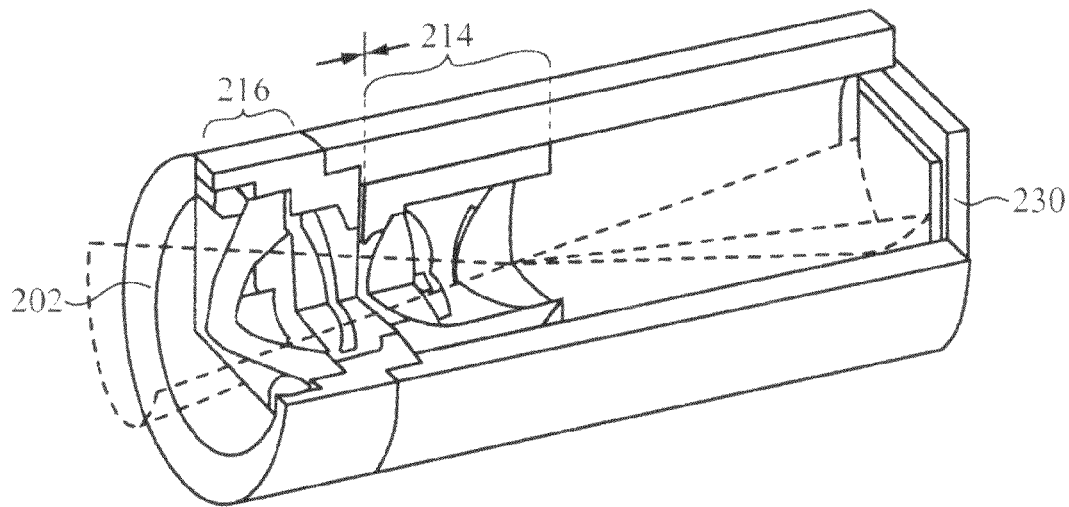
Fig. 2C
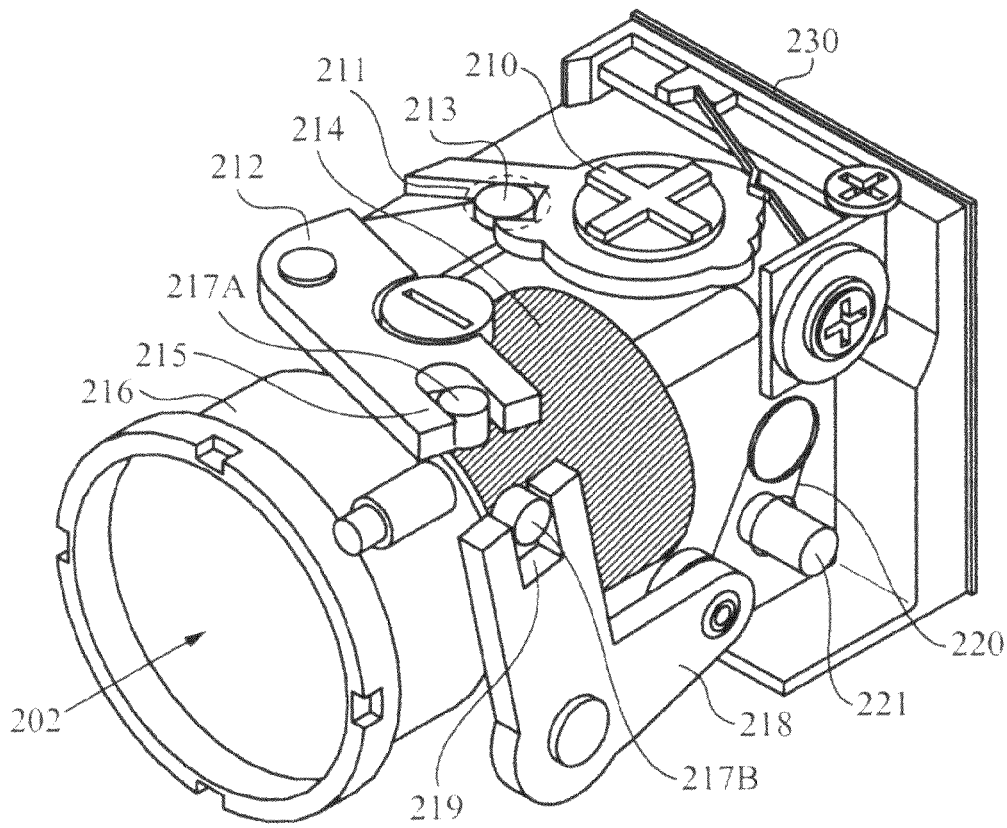
Fig. 2D (TELE)

Fig. 3A (WIDE)

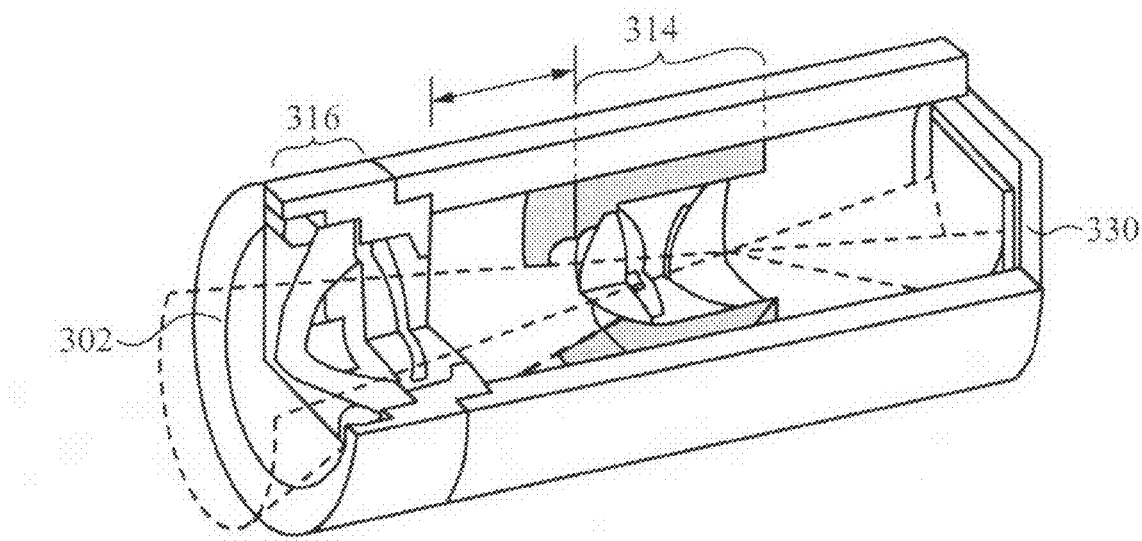
Fig. 3C
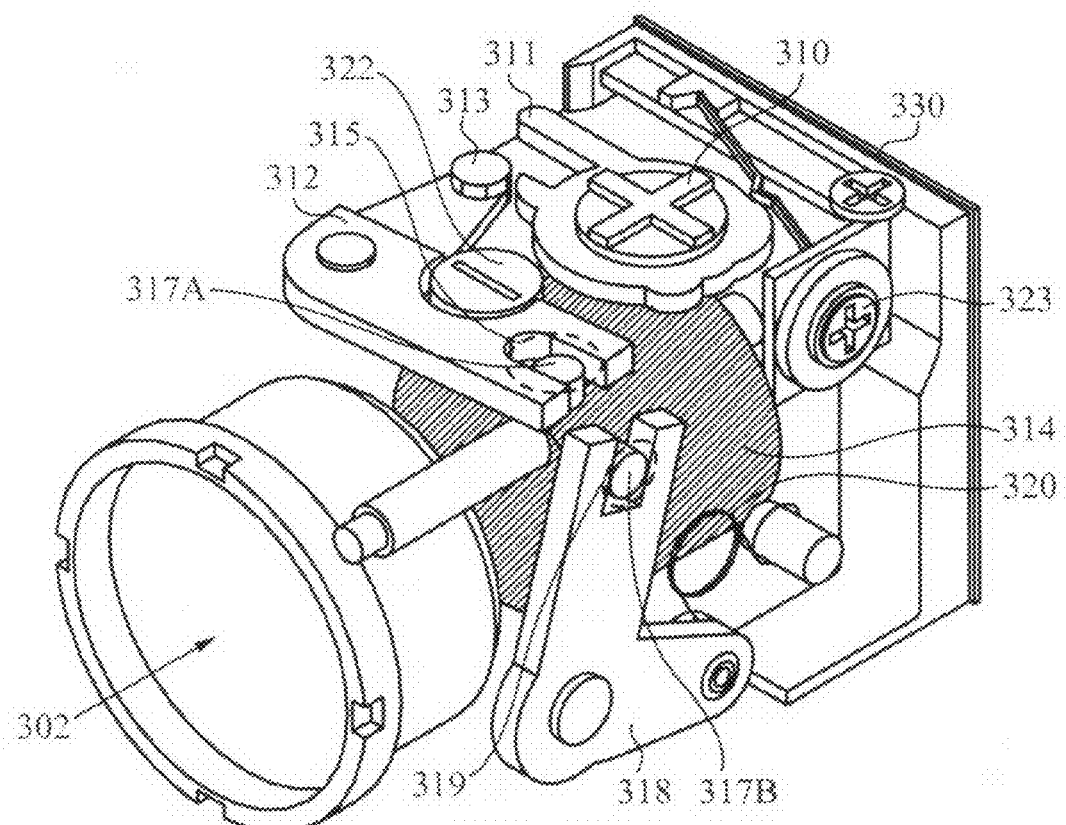
Fig. 3D (WIDE)

Fig. 4A (MACRO)

Fig. 5A (MACRO)

Fig. 5C (WIDE)

CONFIGURABLE TELE WIDE MODULE

FIELD OF THE INVENTION

The present invention is related to camera optics. More specifically, the present invention relates to tele wide module.

BACKGROUND

Recently, there have been numerous developments in digital camera technology. One such development is the further miniaturization of optical and mechanical parts to the millimeter and sub millimeter dimensions. The shrinkage in the moving parts of cameras has allowed the implementation of modern digital camera and optical technology into a broader range of devices. These devices are also constantly being designed and constructed into smaller and smaller form factor embodiments. For example, these days typical personal electronic devices such as cellular phones, personal digital assistants (PDAs), and wrist and/or pocket watches include a miniature digital camera. Moreover, larger form factor devices are also packed with additional features. For example, a typical video camcorder often has an entire digital camera for "still" photography built into the camcorder device along with the mechanisms and circuitry for motion video recording.

Typically, however, modern digital camera implementations suffer from a variety of constraints. Some of these constraints include cost, size, features, and complexity. For instance, with a reduction in size typically comes an increase in cost, a reduction in features and/or an increase in complexity.

SUMMARY OF THE DISCLOSURE

A tele wide module includes a first optics group, a second optics group, a set of predetermined positions for the second optics group, a selector for selecting a first position from the set of predetermined positions, and an image sensor. The first optics group is configured to provide a focus to the image sensor. The focus is based on the selected first position.

In some embodiments, the set of positions comprises: a macro position, a wide position, and a tele position. Preferably, the macro position comprises a position in the set of predetermined positions that is between the tele and wide positions. In these embodiments, the macro position is temporary such that the macro position is selected only by manually moving and holding the selector to a particular macro position in the set of predetermined positions. When the selector is released, the selector automatically returns to another position in the set of positions. In a particular embodiment, the first optics group has a fixed position, and the first optics group and the second optics group are physically adjacent, while in an alternative embodiment, the first and second optics groups are separated by a predetermined distance.

The module of some embodiments further includes a first lever and an omega spring. The orientation of the first lever selects the position from the set of positions and the omega spring provides both a clockwise and a counter clockwise rotational force to the first lever. The direction of the rotational force provided by the omega spring is dependent on the orientation of the first lever.

Preferably, the selector is a manual selector that selects the first position to configure the module without the need for a motor. The selector of some embodiments has a knob coupled to a rotary dial, while the selector of some embodiments has a sliding switch. The image sensor of some embodiments comprises a complementary metal oxide semiconductor (CMOS), while the image sensor of some embodiments comprises a charge coupled device (CCD). The module of some embodiments also has a prism element coupled to the first optics group. The prism directs to the first optics group an image that is at an angle with respect to a plane of the module.

Some embodiments include a method of adjusting a lens configuration. The method selects a first position from a set of positions. Based on the selected position, the method deposes a second lens group in relation to a first lens group. Typically, the position of the first lens group is fixed. Through the first and second lens groups, the method provides an image to an image sensor. The method of some embodiments provides a focused image to the image sensor that is based on a hyper focal setting.

Typically, selecting the macro position from the set of positions includes positioning the second lens group between the tele and wide positions. More particularly, in some embodiments selecting the macro position comprises manually moving and holding the selector in a particular macro position in the set of predetermined positions. Releasing the selector from this position automatically returns the lens configuration to a position different from the macro position in the set of predetermined positions.

Selecting the first position of some embodiments deposes the second optics group physically adjacent to the first optics group, or alternatively deposes the second optics group a predetermined distance from the first optics group. The method of some embodiments selects a second position from the set of positions and deposes the second optics group less than the predetermined distance from the first optics group.

Typically, the method orients a first lever based on the selected first position. In these embodiments, the orientation of the first lever determines the linear distance between the first and second lens groups. Some methods further provide a clockwise and a counter clockwise rotational force by using a single mechanical element. The direction of the rotational force provided by the single mechanical element depends upon the orientation of the first lever. Preferably, the single mechanical element comprises an omega spring.

The selecting often comprises rotating a knob coupled to a rotary dial, or alternatively, the selecting comprises sliding a switch along a guided path. In either case, the selecting preferably is a manual operation without the need for a motor.

BRIEF DESCRIPTION OF THE DRAWINGS

The novel features of the invention are set forth in the appended claims. However, for purpose of explanation, several embodiments of the invention are set forth in the following figures.

FIG. 2A illustrates the barrel configuration for the module in a tele position.

FIG. 2C illustrates a three dimensional rendering of a tele wide module in the tele position according to some embodiments.

FIG. 2D illustrates the tele position in further detail.

FIG. 3A illustrates the barrel configuration for the module in a wide position.

FIG. 3C illustrates a three dimensional rendering of a tele wide module in the wide position according to some embodiments.

FIG. 3D illustrates the wide position in further detail.

FIG. 4A illustrates the barrel configuration for the module in a macro position.

FIGS. 5A, 5B, and 5C illustrate the macro function of the tele wide module in further detail.

DETAILED DESCRIPTION

In the following description, numerous details and alternatives are set forth for purpose of explanation. However, one of ordinary skill in the art will realize that the invention can be practiced without the use of these specific details. In other instances, well-known structures and devices are shown in block diagram form in order not to obscure the description of the invention with unnecessary detail.

I. Structural Overview

Figure 1:
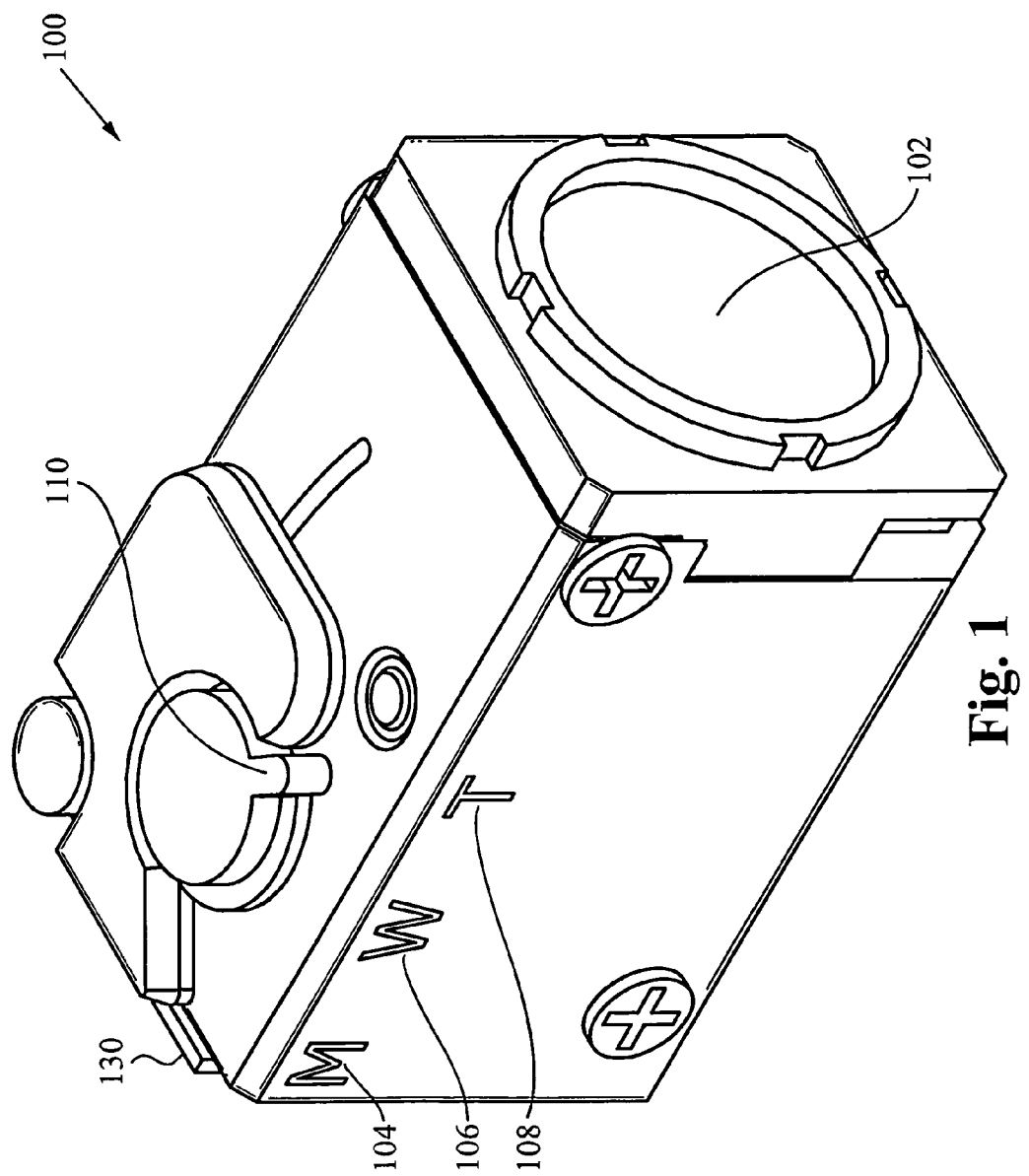
FIG. 1 illustrates a tele wide module in accordance with some embodiments of the invention.

FIG. 1 illustrates a tele wide module 100 in accordance with some embodiments of the invention. As shown in this figure, the module 100 includes a front lens group 102, a knob attached to a tele wide lever 110, and an image sensor 130. The knob rotates the tele wide lever 110, which has three positions: macro 104, wide 106, and tele 108. The front lens group 102 typically comprises one or more optical elements such as a lens. For instance, the module 100 illustrated in FIG. 1 includes a single optical lens in the front lens group 102. Hence this group will be referred to simply as the front lens 102. However, one of ordinary skill will recognize more complex arrangements for the front lens group.

The macro position 104 is for adjusting the focal point of the front lens 102 to a predetermined macro view setting. The macro position 104 is used for close up viewing and/or photography of subjects that are less than 0.4 meters, for example, from the front lens 102. In particular, the macro position 104 of some embodiments is optimized for a focus distance of approximately 7.2 cm to 9.0 cm, or about 2.8 to 3.6 inches.

The wide position 106 is for adjusting the focal point of the front lens 102 to a predetermined wide angle view. The wide angle view is for encompassing a wider photographic scene that is farther than approximately 0.4 meters, for example, from the front lens 102. The field view angle of some embodiments is approximately 64 degrees in the wide position 106.

The tele position 108 is for adjusting the focal point of the front lens 102 to a predetermined position that is suitable for a telephoto view of a camera subject that is farther than about 0.8 meters, for example, from the front lens 102. The field view angle of some embodiments is approximately 32 degrees in the tele position 108. In FIG. 1, the knob and tele wide lever 110 are illustrated with the tele position 108 selected.

A. Telephoto Position

Figure 2B:
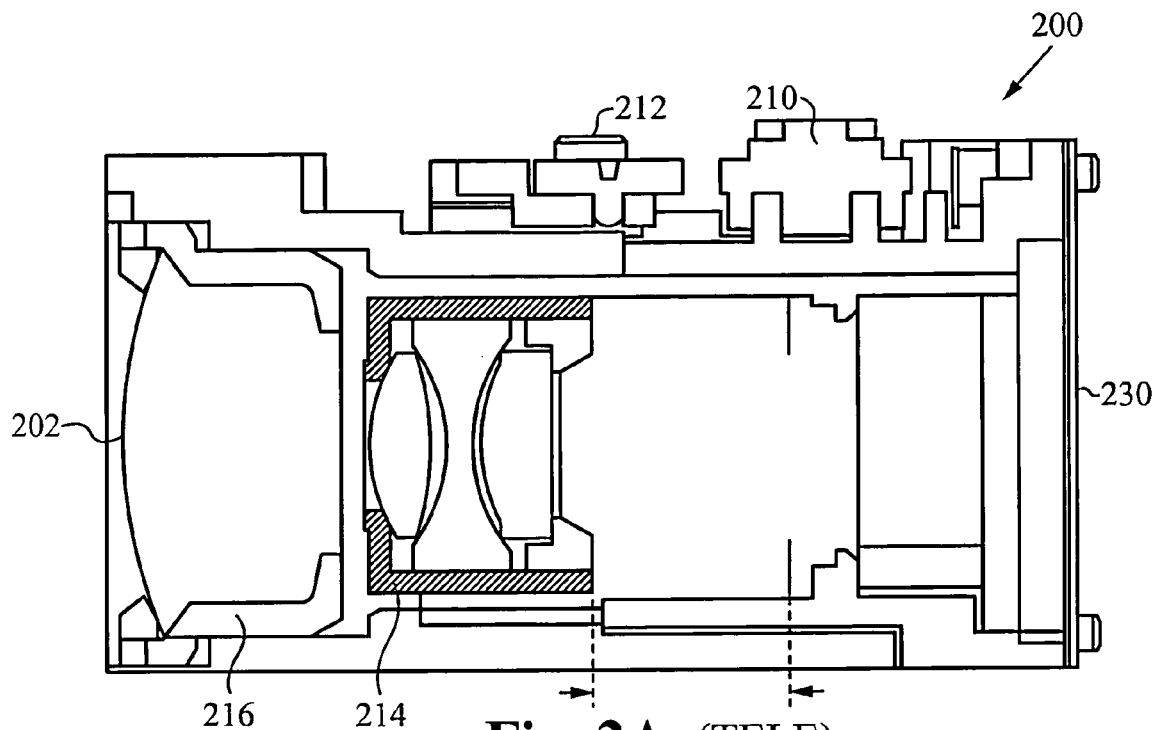
FIG. 2B illustrates mechanical levers of the tele wide module in a tele position.
Figure 2B:
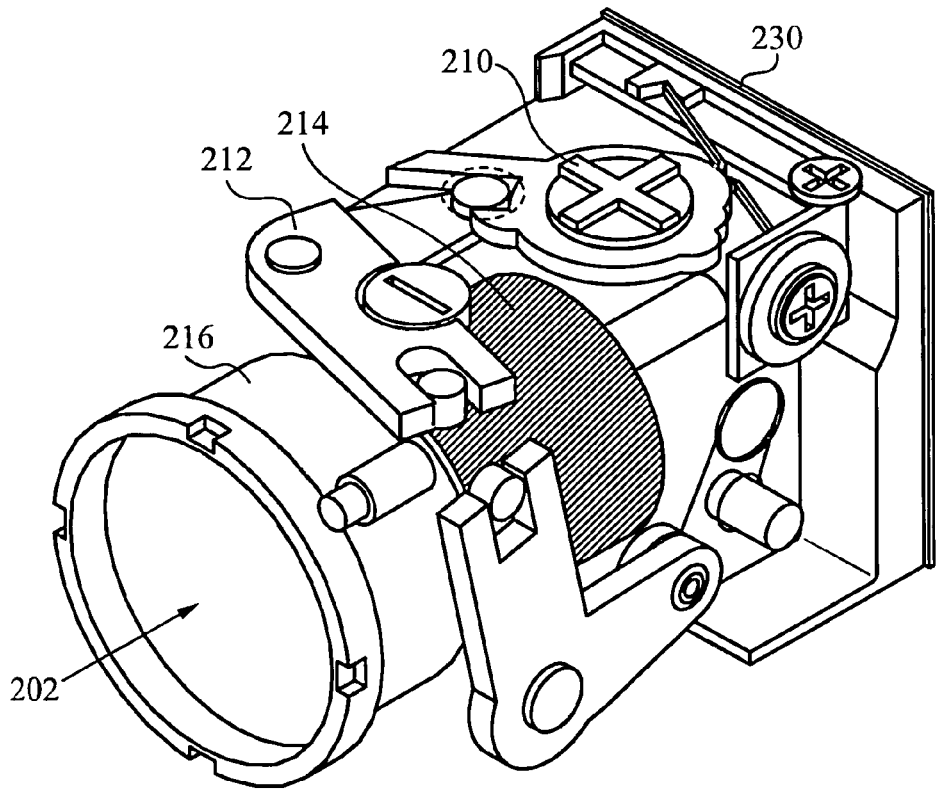

FIGS. 2A, 2B and 2C illustrate further details of a tele wide module 200 in a tele position 108. As shown in these figures, the module 200 comprises a front lens 202, a knob having a tele wide lever 210, a zoom lever 212, a rear barrel 214, a front barrel 216, a spring lever 218, an omega spring 220, and an image sensor 230.

The front barrel 216 typically houses the front lens 202, while the rear barrel 214 typically houses one or more lenses and/or additional optical elements. FIG. 2B illustrates the mechanism of the tele wide lever 210 in conjunction with the other components of the module 200 in further detail. In the tele position 108, the tele wide lever 210 holds the zoom lever 212 in place such that the rear barrel 214 is pushed against the front barrel 216 by the spring lever 218. More specifically, the omega spring 220 provides the force for the spring lever 218 to push the rear barrel 214 against the front barrel 216.

As illustrated in FIG. 2A, when the rear barrel 214 is in a forward position against the front barrel 216, the optical element(s) of the rear barrel 214 adjust the focal point of the front lens 202 such that a telephoto, or zoomed in, image is projected onto the image sensor 230. For instance, FIG. 2C illustrates a three dimensional rendering of a tele wide module 200 in the tele position according to some embodiments. As shown in this figure, the rear barrel 214 is held against the front barrel 216 such that light from an image that passes through the lens 202 is cast onto the image sensor 230 in a certain desirable telephoto configuration.

In addition to the tele position 108, the tele wide module 200 is adjustable to additional positions for providing different focal point views of images. For instance, the module 200 is further capable of providing an image to the image sensor 230 at a wide angle.

B. Wide Angle Position

Figure 3B:
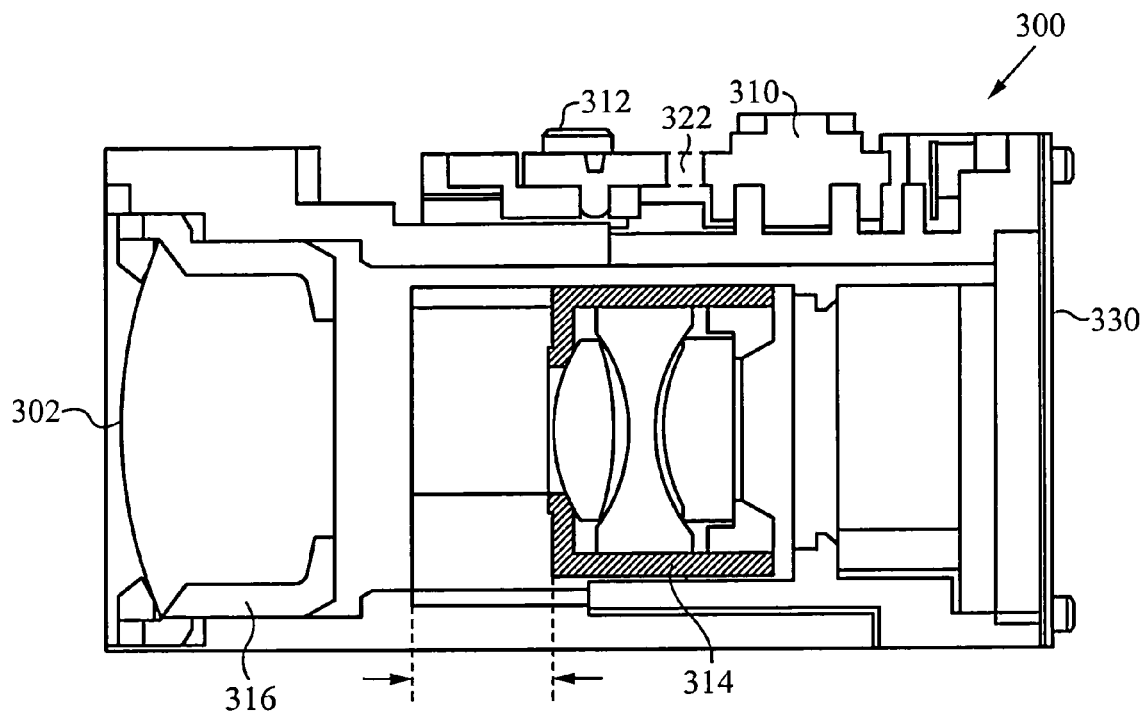
FIG. 3B illustrates the mechanical levers of the tele wide module in a wide position.
Figure 3B:
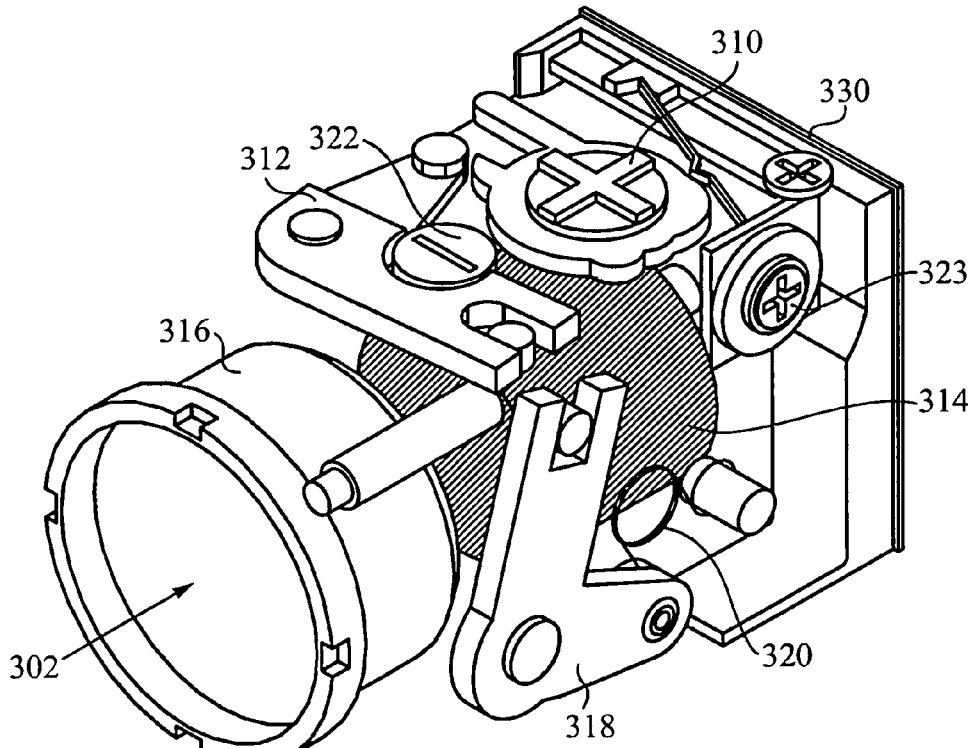

FIGS. 3A, 3B, and 3C illustrate the tele wide module 300 in a wide position 106. As shown in FIG. 3B, when the knob and tele wide lever 310 are in the wide position 106, the zoom lever 312 is released from the tele wide lever 310, and thus the rear barrel 314 is allowed to rest in a position away from the front barrel 316, and preferably back against the rear housing of the module 300. Typically, the rear housing of the module 300 contains a focal adjuster cam 323. Hence, the rear barrel 314 rests against a surface of the focal adjuster cam 323, in the wide position 106. More specifically, the omega spring 320, via the spring lever 318, provides the force that holds the rear barrel 314 against the focal adjuster cam 323.

As illustrated in FIG. 3A, when the rear barrel 314 is in this aft ward position, against the focal adjuster cam 323, the focal point of the lens 302 is adjusted such that it projects a wide angled, or a zoomed out, image onto the image sensor 330.

For instance, FIG. 3C illustrates a three dimensional rendering of a tele wide module 300 in the wide position 106 according to some embodiments. As shown in this figure, the rear barrel 314 is held away from the front barrel 316, and preferably against the focal adjuster cam 323 (see FIGS. 3A-3B), such that light from an image that passes through the lens 302 is cast onto the image sensor 330 in a certain wide angle configuration. In some embodiments, the distance from the front barrel 316 to the rear barrel 314 is approximately 4.7 to 9.4 millimeters.

In addition to the tele 108 and wide 104 positions, some embodiments provide additional configurations for the module 300. For instance, the tele wide module 300 is further capable of providing an image to the image sensor 330 at a macroscopic or close up level.

C. Macroview Position

Figure 4B:
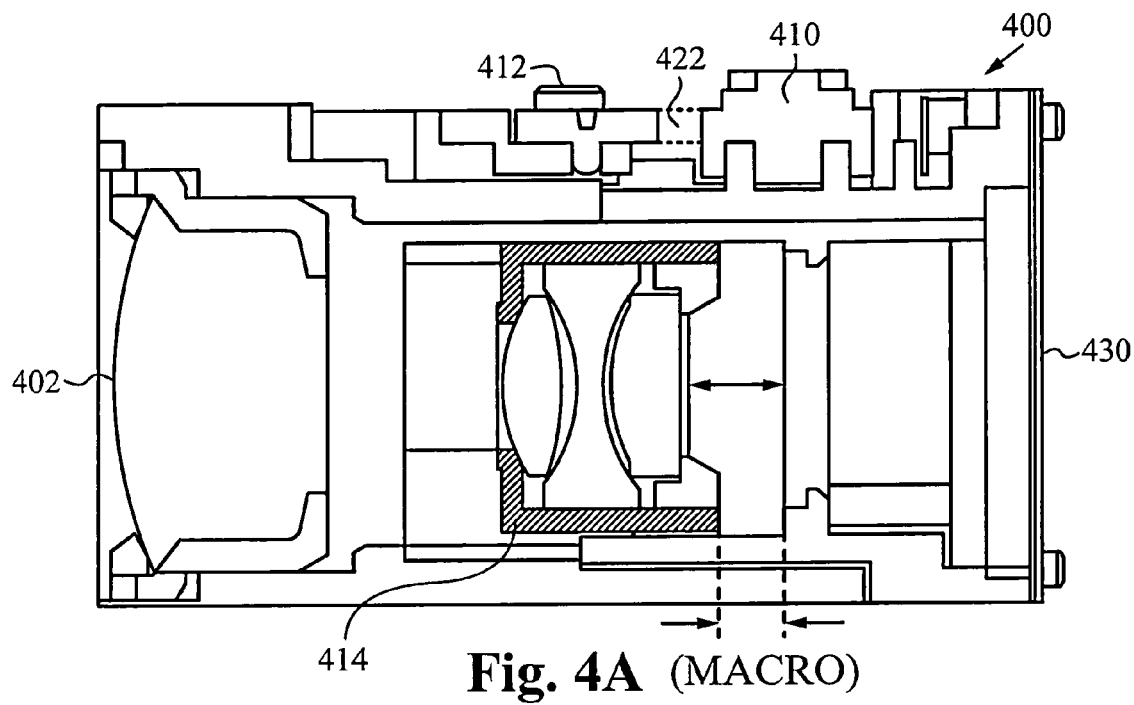
FIG. 4B illustrates the mechanical levers of the tele wide module in a macro position.
Figure 4B:
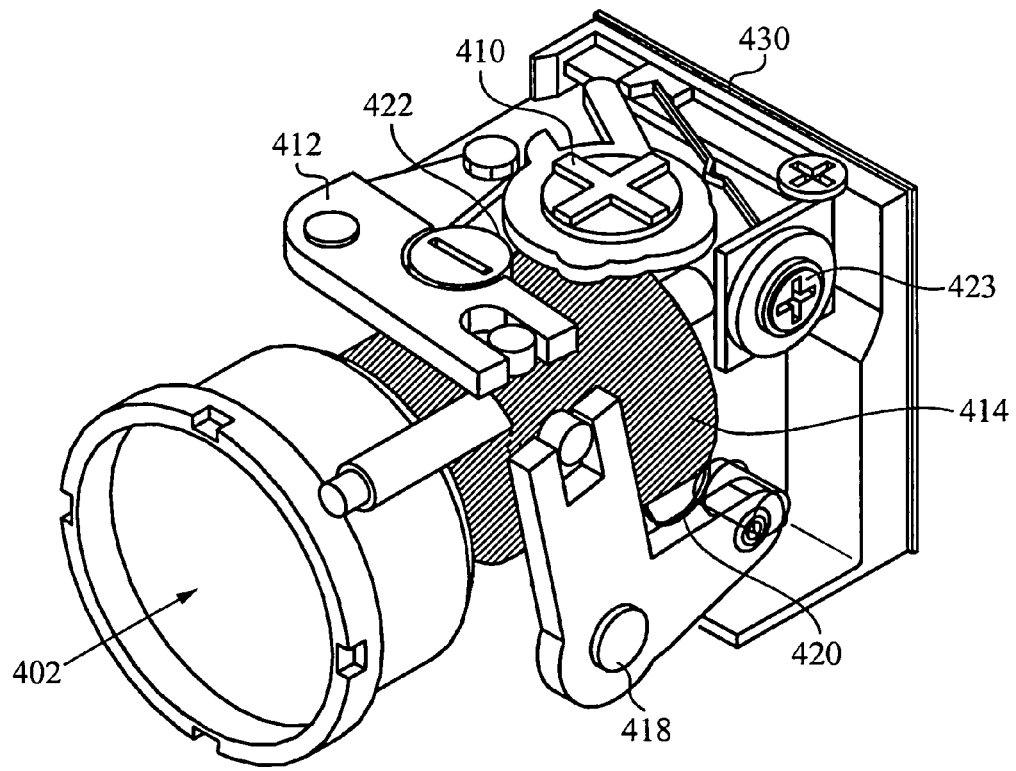

FIGS. 4A and 4B illustrate the tele wide module 400 in a macro position 104. As shown in FIG. 4B, the tele wide lever 410, while in the macro position 104, holds the zoom lever 412 against the macro/wide adjuster cam 422 such that the rear barrel 414 is moved away from the image sensor 430. In some embodiments, the change in distance between the macro and wide positions is approximately less than 1.0 millimeter. More specifically, the omega spring 420 pushes, via the spring lever 418, the rear barrel 414 against the tele wide lever 410, while the tele wide lever 410 holds the rear barrel 414 in place against the force of the omega spring 420.

Figure 5B:
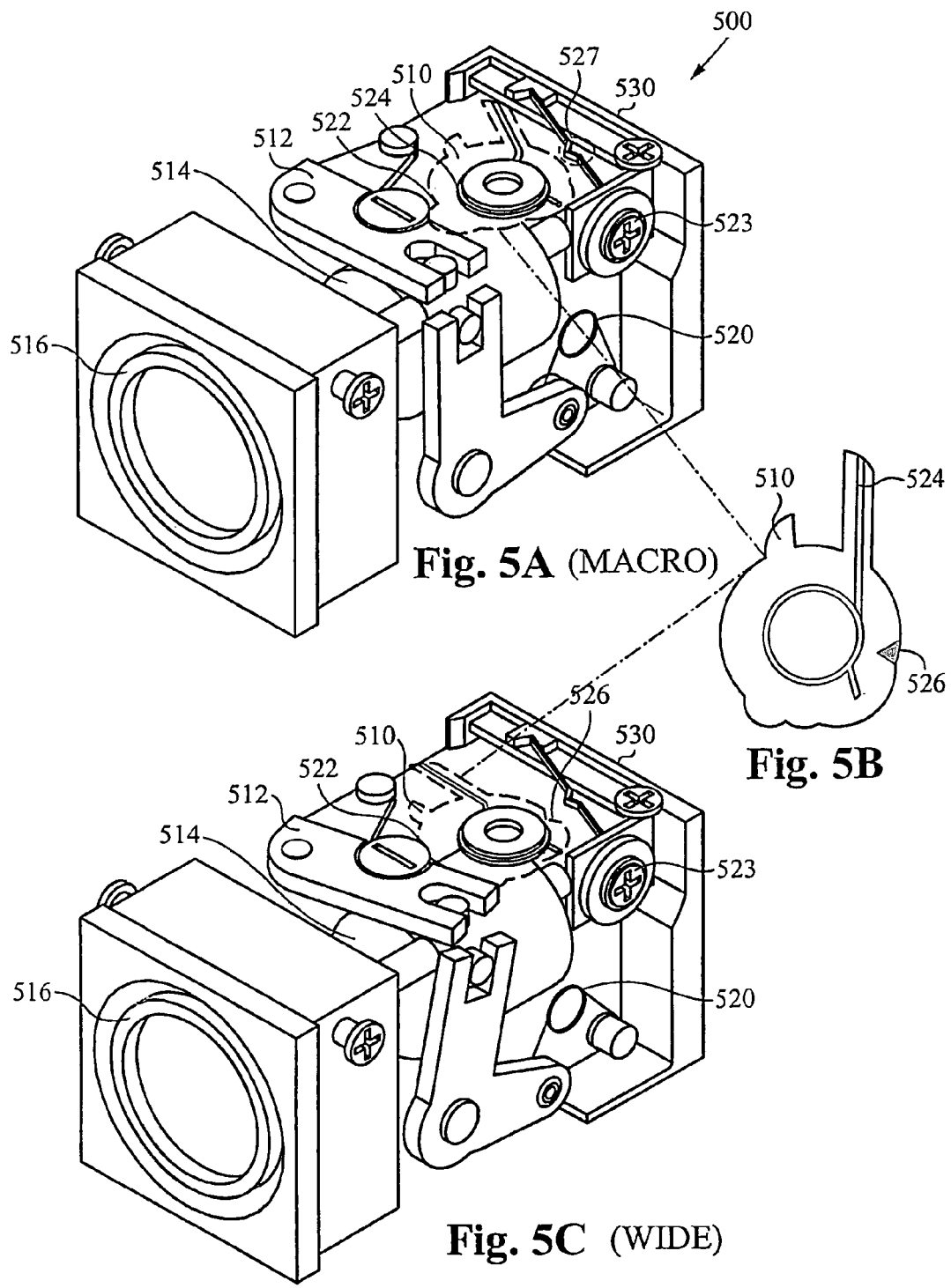

FIGS. 5A, 5B, and 5C illustrate the macro function of the tele wide module 500 in further detail. In FIG. 5A, the tele wide lever 510 is in a macro position 104. As shown in this figure, a macro return spring 524 is coupled to the tele wide lever 510 and provides a counterclockwise force to the tele wide lever 510. In the illustrated embodiment, the macro return spring 524 presses against the housing of the module 500 to provide the force while in the macro position 104.

Also shown in FIGS. 5A and 5B, in the macro position 104, the tele wide lever 510 presses against the macro/wide adjuster cam 522, which rotates the zoom lever 512 clockwise, to position the rear barrel 514 further away from the image sensor 530. As mentioned above, the distance the tele wide lever 510 moves the zoom lever 512 laterally is approximately less than 1.0 millimeter, in some embodiments.

Then, as illustrated in FIG. 5C, when the tele wide lever 510 is released from the macro position 104, the macro return spring 524 causes counterclockwise rotation of the tele wide lever 510 until the lever 510 returns to the wide position 106. In the illustrated embodiment, a notch 526 locates the wide position 106 for the tele wide lever 510 during its clockwise and counterclockwise rotation. A detent 527 interacting with the notch 526 keeps the tele wide lever 510 held stationary, when the wide position 106 is selected for the optical elements of the module 500. Preferably, the detent 527 interacts with two separate notches in the tele wide lever 510, one for the wide position and one for the tele position. The notch 526 described above hinders the tele wide lever 510 from rotating counter clockwise past the wide position after the lever 510 has been released from the macro position 104. The tele wide lever 510 preferably further includes a second notch for the tele position that deters accidental rotation of the lever 510 from the tele position.

In some embodiments of the module 500, the rear barrel 514 slides between the front barrel 516 and the image sensor 530, on a set of guide pins.

D. Guide Pin Arrangement

The module of some embodiments is constructed by a front and rear housing connected to one another by snap fit approach in which two guide pins are used for alignment. The guide pins are further used to guide the rear barrel, which includes a hole and an adjacent slot, when moving to the designated tele, wide, and macro positions. Attached to the rear housing are the image sensor and, optionally, an infrared (IR) filter and/or a low pass filter. Attached to the front housing are the front barrel and optionally a prism. The housing of the module preferably further includes a casing and a cover mechanism comprising, for example, a cover, a cover lever, a cover spring, and a bracket. The cover mechanism preferably prevents light leakage and dust contamination from affecting the internal components of the module, particularly the lens groups and the image sensor.

Figure 6:
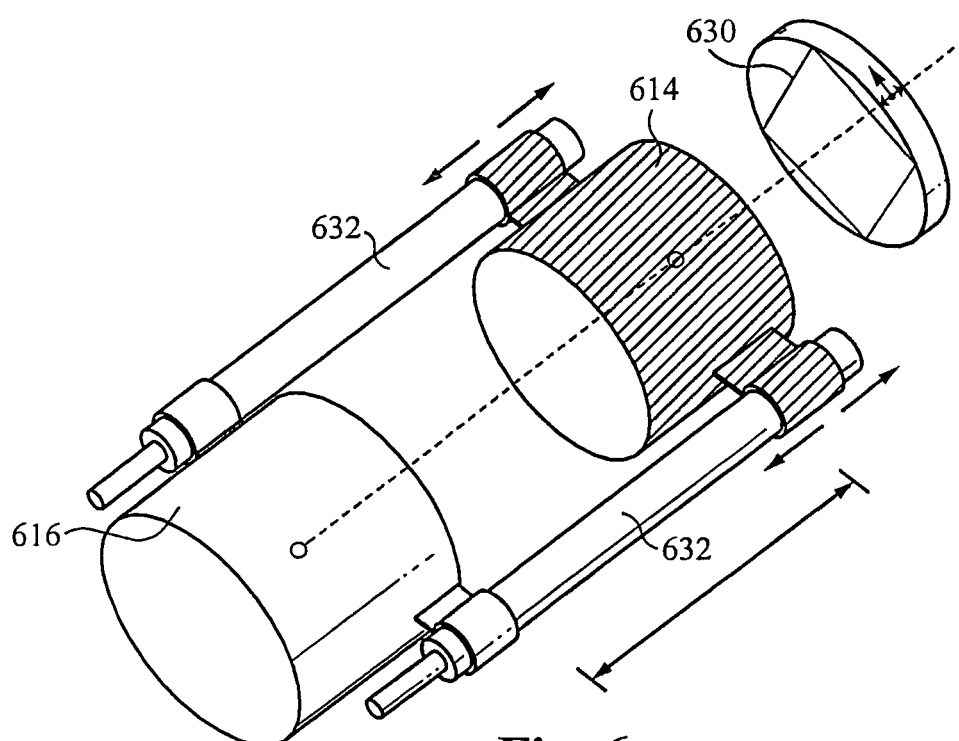
FIG. 6 illustrates a guide pin arrangement for a tele wide module in accordance with some embodiments.

FIG. 6 illustrates a guide pin arrangement for a tele wide module in accordance with some embodiments. As shown in these figures, the module 600 further comprises a set of guide pins 632. Some embodiments include a pair of guide pins, while some embodiments employ a different number of guide pins. Regardless of their number, the guide pins 632 are typically mounted along a linear axis of the module 600 to permit the rear barrel 614 to slide from the front barrel 616 (in the tele position 108) toward the image sensor 630 (in the wide position 106). In some embodiments, the range of motion provided to the rear barrel 614 by the guide pins 632 is approximately 4.7 to 9.4 millimeters.

Due to this range of motion, however, the guide pins 632 of some embodiments often affect the form factor of the module 600. Hence, some embodiments further include means for modifying and/or concealing the form factor of the module 600.

E. Prism Feature

For instance, some embodiments additionally include a prism feature. This feature allows the tele wide module to be disposed and/or mounted in a variety of orientations. For instance, the horizontal width of a particular implementation is often limited such that the module is preferably disposed lengthwise in the vertical plane of an enclosure. This orientation allows the range of motion of the rear barrel along the guide pins, as described above, to be implemented in a device having a small width and/or depth form factor.

Figure 7A:
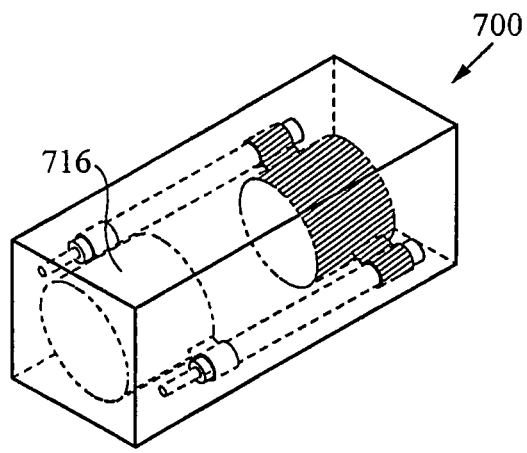
FIGS. 7 and 8 illustrate a prism feature of some embodiments.
Figure 7B:
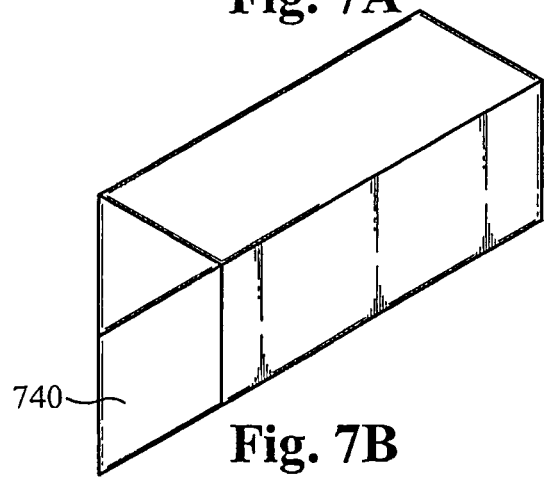
Figure 7C:
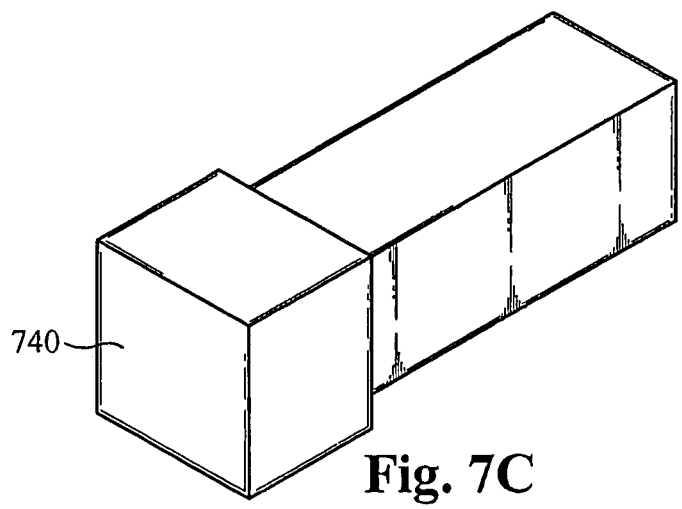
Figure 8A:
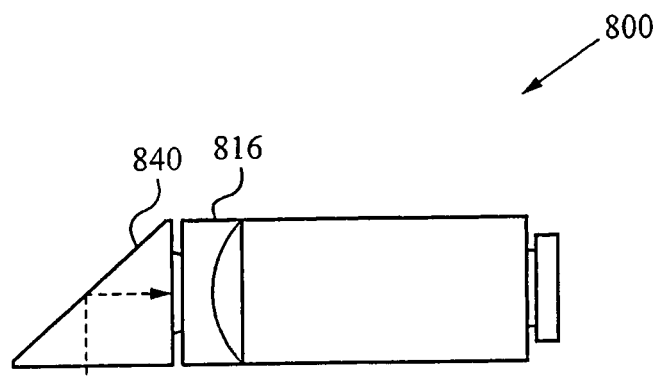
Figure 8B:
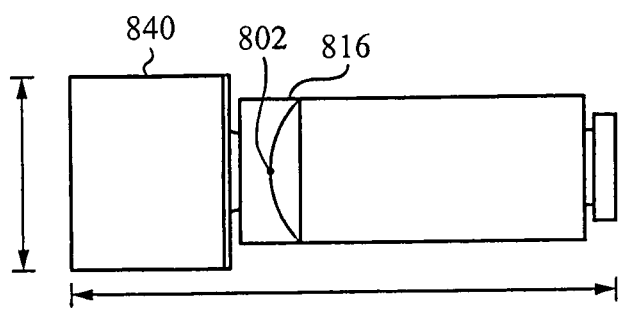

FIGS. 7-8 illustrate a prism feature of some of these embodiments. FIG. 7 includes a module 700 with a prism 740 mounted at the front barrel 716. The prism 740 redirects the light from an image at an angle with respect to the front barrel 716. As described above, the front barrel 716 typically houses a front lens group. The front lens group contains one or more front optical elements such as the front lens 102 illustrated in FIG. 1. Hence the prism 740 allows the module 700 to be disposed in a variety of orientations within a device that is typically held at an angle with respect to the subject being viewed and/or photographed.

FIG. 8 illustrates the small form factor of a prism 840 mounted on a module 800 in accordance with some embodiments. In these embodiments, the combination of a prism holder and a prism bracket advantageously mount the prism adjacent to the front lens 802 of the module 800. As described above, the prism 840 typically redirects light from a subject image that is at an angle with respect to the front lens 802 of the module 800.

F. Other Configurations

Figure 9:
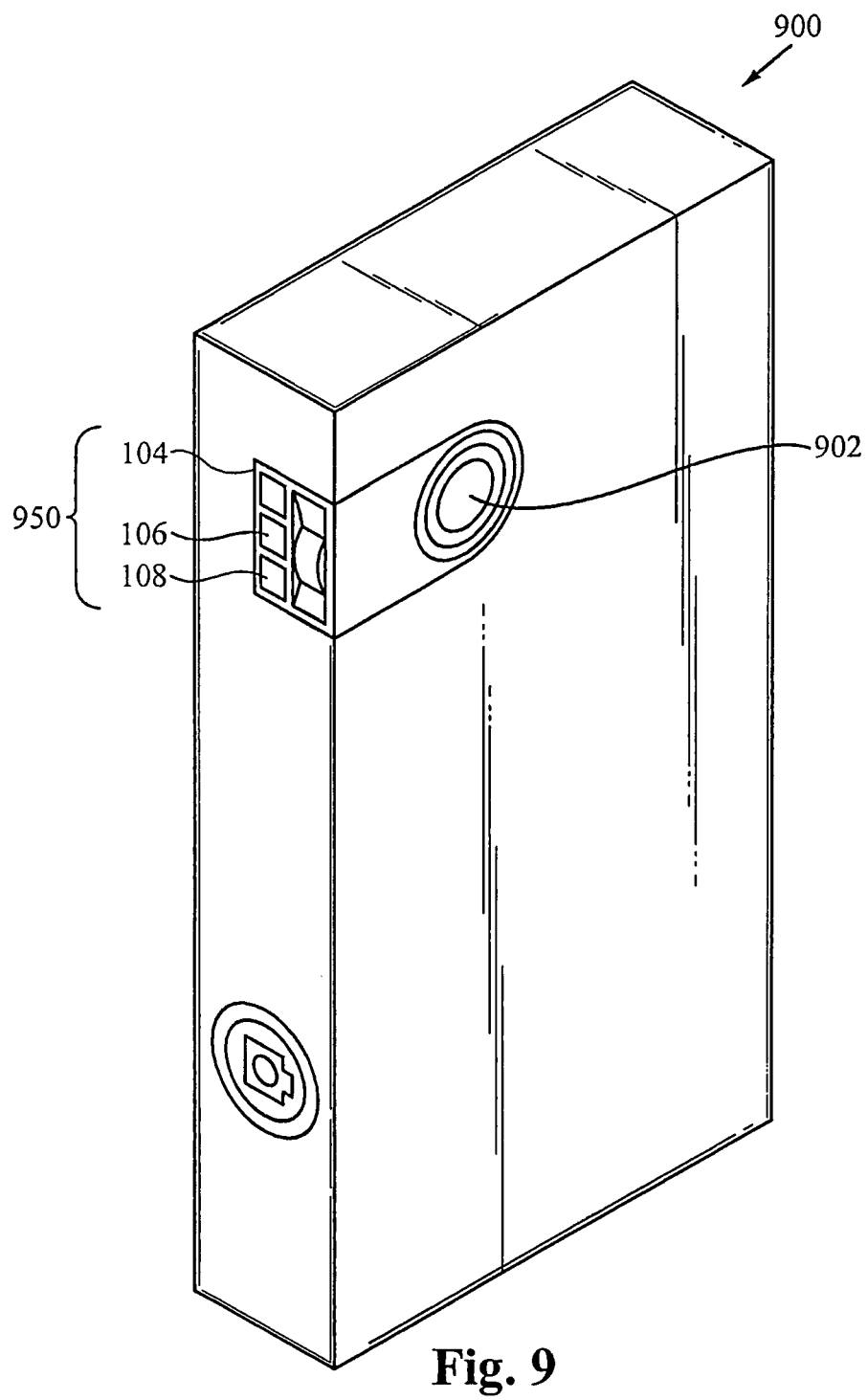
FIG. 9 illustrates an exemplary implementation of the stepped zoom feature of some embodiments.

FIG. 9 illustrates an exemplary implementation of the stepped zoom feature of a module having a small depth form factor. As shown in this figure, the tele wide lever is actuated by using a sliding selector 950, instead of the knob illustrated in FIG. 1. The sliding selector 950 adjusts the position of the tele wide lever to select the macro 104, wide 106, and tele 108 modes described above. Further details regarding these modes are described next.

II. Setup and Operation

In the embodiments illustrated and described above, the optical arrangement of the tele wide module consists of a stationary front lens group in a front barrel and a moveable rear lens group in a rear barrel. In the exemplary illustrations, the front barrel includes one lens or optical element, while the rear barrel contains three optical lens elements. However, one of ordinary skill will recognize that the front and rear barrels of different embodiments contain different numbers and/or types of lenses and optical elements. Regardless of the number and/or type of elements, some embodiments provide a variety of configurations for the tele wide module. The particular movement of the mechanism of some of these embodiments is further described below.

For instance, FIG. 2D illustrates the mechanism of FIGS. 2A, 2B, and 2C in further detail. As shown in this figure, a slot in the tele wide lever 210 interacts with the zoom lever 212. In some embodiments, the slot 211 on the tele wide lever 210 engages a cylindrical pin 213 on the zoom lever 212. The torque of the tele wide lever 210 on the zoom lever 212 (via the slot-to-pin engagement) causes the zoom lever 212 to rotate. The zoom lever 212 also has a slot 215 that engages a pin 217A on the rear barrel 214. In the illustrated embodiment, the pin 213 and the slot 215 on the zoom lever 212 are about 90 degrees offset from each other.

The rear barrel 214 of some embodiments includes a secondary pin 217B to engage the slot 219 of the spring lever 218, while the rear barrel 214 slides on the guide pin(s). The spring lever 218 also rotates clockwise and counter clockwise. The rear barrel 214, as it slides forward and aft ward on the guide pin(s), causes the spring lever 218 to interact with the omega spring 220. The omega spring 220, preferably comprises two end loops and serves as the main spring for the "over-the-center" mechanism. One end loop of the omega spring 220 is coupled to a pin 221 on the rear housing and the other end loop is coupled to the spring lever 218.

"Over the Center" Mechanism

Through the above described rotational engagement of the various levers, and the front and rear barrels, the omega spring 220 operates as follows: The two end loops of the omega spring 220 are constantly pushing away from one another, which alternately provides a clockwise and counter clockwise rotational force on the spring lever 218. The direction and degree of the rotational force on the spring lever 218 is dependent on the degree and rotation "over-the-center" of the spring lever 218. For instance, in the counter clockwise rotation of the spring lever 218, the omega spring 220 pushes the rear barrel 214 (via the above described slot-to-pin engagement with the spring lever 218) towards the tele position 108. Whereas, in the clockwise rotation of the spring lever 218, the omega spring 220 pushes the rear barrel 214 (via the spring lever 218) towards the wide position 106. Moreover, the omega spring 220 provides the force that enables the rotation of the tele wide lever 210 into the macro position 104.

A. Tele Setup and Operation

In the tele position 108 of the module 200, the rear barrel 214 is placed in direct contact with the front barrel. Hence, in this position 108, the front lens group and the rear lens group are placed physically adjacent each other. In order to adjust the module 200 to the proper focal distance in the tele position 108, the front barrel 216 and the rear barrel 214 are moved together, by rotating the front barrel 216 clockwise or counter clockwise via a thread connection to the front housing, to a preferred sharp image (focused) position. The focused position is preferably the hyper focal distance.

The following mechanism sets the tele position 108 of some embodiments. The tele wide lever 210 is rotated counter clockwise and at the same time the zoom lever 212 is rotated clockwise (via the pin-to-slot engagement), while the rear barrel 214 is moved forward (slot-to-pin engagement) towards the front barrel 216. As a result of such forward motion, the rear barrel 214 moves the spring lever 218 counterclockwise (via the pin-to-slot engagement), whereby the omega spring 220, after passing over-the-center, pushes the spring lever 218 clockwise. The spring lever 218 in return pushes the rear barrel 214 to a leaning position against the front barrel 216, and the tele position 108 is set.

B. Wide

FIG. 2D illustrates a mechanism for setting the module 300 in the wide position 106. The tele wide lever 310, now in the tele position 108, is rotated clockwise and, while rotating the zoom lever 312 counterclockwise, the rear barrel 314 is moved aft wards, back towards the image sensor 330. During such aft ward motion, the rear barrel 314 moves the spring lever 318 clockwise, whereby the omega spring 320, after passing over-the-center, pushes the spring lever 318 clockwise as well. The spring lever 318 in return pushes the rear barrel 314 to a leaning position against the focal adjuster cam 323 By rotating the focal adjuster cam 323 clockwise or counterclockwise, the rear barrel 314 is set to a preferred sharp image focus, in the wide position 106. As mentioned, this preferred focal position typically includes the hyper focal distance for the wide position 106.

Then, as shown in FIG. 5C, the tele wide lever 510 is held in the wide position 106 by the detent 527, which is typically a flat sheet metal spring, and the macro return spring 524. The macro return spring 524 is typically a torsion spring. As mentioned above, the detent 527 prevents the tele wide lever 510 from rotating counter clockwise, while the macro return spring 524 prevents the tele wide lever 510 from rotating clockwise, in the wide position 106.

C. Macro

FIGS. 4A-4B and 5A-5C illustrate a mechanism for setting the macro position 104. As shown in FIG. 5C, the tele wide lever 510, now in the wide position, is rotated clockwise, against the force of the macro return spring 524, until the protruding arm of the slot on the tele wide lever 510 leans against the rear housing of the module 500. The tele wide lever 510 preferably includes a macro adjuster cam 522 having a protruding contact point that moves the zoom lever 512 laterally, while pushing against the omega spring 520. Accordingly, the macro adjuster cam 522 pushes forward against the rear barrel 514 such that the rear barrel 514 slides to the designated macro position along the guide pin(s). For instance, in some embodiments, while holding the tele wide lever 510 in this position, the macro adjuster cam 522 is rotated until the rear barrel 514, is set to a preferred sharp image focus, in the macro image position 104 (of FIG. 1). Typically, the macro adjuster cam 522 is fastened in a preferred fixed (focused) location with an adhesive.

D. Automatic Reset to Wide Position

From the macro position 104 of FIG. 5A, if the tele wide lever 510 is released, the module 500 will automatically return to the wide position 106 of FIG. 5C. The macro return spring 524 will rotate the tele wide lever 510 counter clockwise until the arm of the spring 524 rests against the rear housing. The wide position 106 is set again by the constant force of the omega spring 520 and the holding position of the tele wide lever 510, set by the detent 527 and the macro return spring 524, as described above. Hence, the macro position 104 must be intentionally selected and manually held in place each time that it is used. This "automatic reset" feature of some embodiments prevents the inadvertent use of the macro position 104 setting for general photography. As is known in the art, user error often produces out-of-focus photography by undesirably forgetting to remove a previously selected macro option during the "shooting" of wide angle and telephoto scenes.

Figure 10:
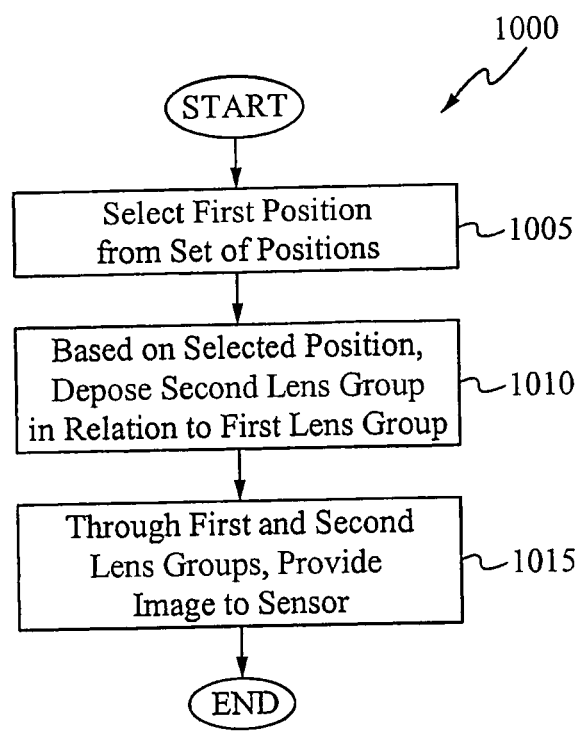
FIG. 10 is a process flow that illustrates a method of adjusting a lens configuration in accordance with some embodiments of the invention.

FIG. 10 is a process flow 1000 that illustrates a method of adjusting a lens configuration, in accordance with some embodiments of the invention. As shown in this figure, the process 1000 begins at the step 1005, where a first position is selected from a set of positions. In some embodiments, the selected positions include three optical focus configurations, including a macro, a wide, and a tele position. Then, after the step 1005, the process 1000 transitions to the step 1010 where, based on the selected position, a second lens group is disposed in relation to a first lens group. Typically, and as mentioned above, the position of the first lens group is fixed. Preferably, the second lens group is disposed in a hyper focal position that positions the lens groups a predefined distance from each other, in order to provide one or more hyperfocal images. Some embodiments dispose the second lens group by using a compact, small form factor assembly of springs and levers, without the need for bulky and/or motorized parts.

Some embodiments employ a sliding assembly having very few moving parts to achieve three focal positions by using the single sliding assembly. These embodiments are typically small, cost effective, and reliable for a variety of small form factor lens applications. After the second lens group is disposed in the selected position, the process 1000 transitions to the step 1015, where through the first and second lens groups, an image is provided to an image sensor. After the step 1015, the process 1000 concludes.

III. Advantages

As illustrated in the foregoing examples, the module of some embodiments is set to three different optical positions: tele, wide, and macro, by direct rotational mechanical movement. These different optical positions advantageously provide a variety of picture taking modes. After proper adjustment of each individual (optimal or hyper) focal distance, the various positions and/or picture-taking modes are optimally pre-set to fixed focus configurations for the module. Hence, some of the embodiments described above provide three fixed focal lengths in a small form factor. These embodiments advantageously allow more sophisticated implementations for small devices that typically have limited capacity for multi focal optical and/or camera mechanisms. For instance, some embodiments advantageously include three focal positions of tele, wide, and macro in otherwise simple and compact devices. Since the described embodiments require limited range of motion, and have minimal space requirements, these embodiments have a variety of applications in ultra compact portable devices, such as, for example, in mobile phones and other consumer electronics.

In some embodiments a rotation knob sets the position of the optics, while in some embodiments a mechanical slide toggles the set focal lengths and moves the optical elements. Advantageously, the mechanism of these embodiments typically operate manually. Further, while realizing the benefits of multi focal functionality, the embodiments described above require little space and require only a limited range of motion, while having a low cost. For instance, some embodiments have no need for a complex, costly and bulky auto-focus system and are instead optimized for infinity focus. Moreover, there is no need for electrical actuator motors and/or driver electronics. These embodiments employ either manual or automatic (levered) actuation of the predefined optical focus positions and configurations.

In reduction to practice, a "2× Tele Wide Module" is successfully implemented in a module having a 2× (telephoto) magnification in conjunction with an additional macro setting. This embodiment employs a 1600×1200 pixel (2.0 Megapixel) sensor with a pixel size of 2.8 microns and a diagonal sensor size of 5.6 mm. In an alternative embodiment, a 2000×1500 pixel (3.0 Megapixel) sensor having a pixel size of 2.2 microns is used. The image sensors of these embodiments are typically CMOS type image sensors. However, one of ordinary skill recognizes the use of other types of image sensors, including charge coupled device (CCD) type image sensors, for example.

The optical elements of some embodiments include a 2× telephoto/wide-angle lens arrangement. As described above, the optical elements of some embodiments are divided into two groups, one group housed in a front barrel, the other group housed in a rear barrel. Preferably, one group is fixed in place at the time of manufacture. Accordingly, despite the confined space, the module of these embodiments provides multiple optical modes through the use of a single movable lens group. Typically, the precise motion of this single group within confined spaces is achieved by using the mechanism(s) described above. In some embodiments, each group includes three lens elements in each group. Some of these embodiments preferably include four plastic and two glass elements.

Also described above, several embodiments include one or more of a macro, wide, and/or a telephoto modes. Hence, these embodiments include camera and lens features that support such modes. For instance, some embodiments include an F-stop of F3 for wide and macro mode settings, and F4.2 for a telephoto setting. These embodiments include a focal length of approximately 4.7 to 9.4 mm and a field angle of approximately 32-64 degrees. Some embodiments further include a fixed focus at an appropriate distance for each mode setting. For instance, the focus distance of some embodiment is 0.4 m to infinity for wide mode, 0.8 m to infinity for tele mode, and approximately 7.2 cm to 9.0 cm (2.8" to 3.6") for macro mode. The distortion of these embodiments is typically about 3%, with a flare of about 3% maximum. The form factor of the tele wide module of some embodiments is approximately 21×12×11.5 mm.

In some embodiments, the user inputs are manual, with a mechanical dial or slide selector to select wide, telephoto, and macro settings. In these fixed focal length solutions a mechanical dial and/or slide preferably toggles between three set focal lengths by moving one group of lenses a particular distance in the manner described above.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A tele wide module comprising:
   a first optics group;
   a second optics group slidably mounted along guide pins for moving the second optics group to each position in a set of predetermined positions, wherein the predetermined positions comprise a macro position, a wide position, and a tele position, and the macro position is between the tele and wide positions;
   a first lever, wherein the orientation of the first lever selects the position;
   a selector for selecting a first position for the second optics group from the set of predetermined positions using direct rotational mechanical movement, and wherein the selector comprises a manual selector that selects the first position for the second optics group from any one of the set of predetermined positions to configure the module without the need for a motor;
   an omega spring, wherein the omega spring provides both a clockwise and a counter clockwise rotational force to the first lever, wherein the direction of the rotational force provided by the omega spring is dependent on the orientation of the first lever; and
   an image sensor, wherein the first optics group is stationary relative to the image sensor and is configured to provide a focus to the image sensor, wherein the focus is based on the selected first position.

2. The module of claim 1, wherein the macro position is temporary such that the macro position is selected only by manually moving the selector to a particular macro position in the set of predetermined positions, wherein when the selector is released, the selector automatically returns to another position in the set of positions.

3. The module of claim 1, further comprising a fixed position for the first optics group, wherein the first optics group and the second optics group are physically adjacent.

4. The module of claim 1, wherein the first and second optics groups are separated by a predetermined distance.

5. The module of claim 1, wherein the selector comprises a knob coupled to a rotary dial.

6. The module of claim 1, wherein the selector comprises a sliding switch.

7. The module of claim 1, wherein the image sensor comprises one of a complementary metal oxide semiconductor (CMOS) and a charge coupled device (CCD).

8. The module of claim 1 further comprising a prism element coupled to the first optics group, wherein the prism directs to the first optics group an image that is at an angle with respect to a plane of the module.

9. The module of claim 1, wherein the selector transfers a force to the second optics group that contributes to the movement of the second optics group toward the tele position when the selector is moved to the tele position.

10. The module of claim 1, wherein the selector transfers a force to the second optics group that contributes to the movement of the second optics group toward the wide position when the selector is moved to the wide position.

11. The module of claim 1, wherein a portion of the selector applies a force to the first lever that selects the position in the tele and wide positions.

12. The module of claim 11, wherein the portion of the selector that applies a force to the first lever comprises one of a slotted portion and a cam portion.

13. The module of claim 1, wherein the second optics group is located between the first optics group and the image sensor.

14. A method of adjusting a lens configuration, the method comprising:
 selecting a first position from a set of positions using direct rotational mechanical movement, wherein the set of positions comprises a macro position, a wide position, and a tele position and the macro position is between the tele and wide positions, and wherein the selecting comprises a manual operation comprising selecting any one from the set of predetermined positions to configure the module without the need for a motor;
 based on the selected position, disposing a second lens group in relation to a first lens group by sliding the second lens group along multiple guide pins, wherein the position of the first lens group is fixed relative to an image sensor;
 orienting a first lever based on the selected first position, wherein the orientation of the first lever determines the linear distance between the first and second lens groups;
 providing a clockwise and a counter clockwise rotational force to the first lever using an omega spring, wherein the direction of the rotational force provided by the omega spring depends upon the orientation of the first lever; and
 through the first and second lens groups, providing an image to the image sensor.

15. The method of claim 14 further comprising providing a focused image to the image sensor, wherein the focused image comprises a hyper focal setting.

16. The method of claim 14, wherein selecting the macro position comprises manually moving and holding the selector in a particular macro position in the set of predetermined positions, wherein releasing the selector automatically returns the lens configuration to a position different from the macro position in the set of predetermined positions.

17. The method of claim 14, wherein selecting the first position comprises disposing the second lens group physically adjacent to the first lens group.

18. The method of claim 14, wherein selecting the first position comprises disposing the second lens group a predetermined distance from the first lens group.

19. The method of claim 18 further comprising selecting a second position from the set of positions, where selecting the second position disposes the second lens group less than the predetermined distance from the first lens group.

20. The method of claim 14, wherein the selecting comprises rotating a knob coupled to a rotary dial.

21. The method of claim 14, wherein the selecting comprises sliding a switch along a guided path.

22. The method of claim 14, wherein the disposing of the second lens group is accomplished at least in part by a manual mechanical force generated by the selecting step at least for the tele and wide positions.

23. The method of claim 14, wherein the second lens group is located between the first lens group and the image sensor.

* * * * *